United States Patent [19]

Murata

[11] Patent Number: 4,490,007
[45] Date of Patent: Dec. 25, 1984

[54] OPTICAL FIBER ALIGNMENT MECHANISM AND CONNECTORS USING THE SAME

[75] Inventor: Hisashi Murata, Ibaraki Prefecture, Japan

[73] Assignee: Nippon Telegraph & Telephone Public Corp., Tokyo, Japan

[21] Appl. No.: 76,779

[22] Filed: Sep. 18, 1979

[30] Foreign Application Priority Data

| Sep. 20, 1978 | [JP] | Japan | 53-116220 |
| Jan. 22, 1979 | [JP] | Japan | 54-4728 |
| Jan. 22, 1979 | [JP] | Japan | 54-4729 |
| Apr. 16, 1979 | [JP] | Japan | 54-46440 |
| Apr. 23, 1979 | [JP] | Japan | 54-48930 |

[51] Int. Cl.³ ............................................ G02B 7/26
[52] U.S. Cl. ............................. 350/96.21; 350/96.20
[58] Field of Search ................ 350/96.20, 96.21, 96.22

[56] References Cited

U.S. PATENT DOCUMENTS

| 3,989,567 | 11/1976 | Tardy | 350/96.21 X |
| 4,047,796 | 9/1977 | Kao et al. | 350/96.21 |
| 4,050,781 | 9/1977 | Beauhaire | 350/96.21 |
| 4,050,783 | 9/1977 | Tardy | 350/96.21 |
| 4,056,305 | 11/1977 | McCartney et al. | 350/96.21 |
| 4,061,416 | 12/1977 | Stewart | 350/96.21 |
| 4,087,155 | 5/1978 | Deacon | 350/96.21 |
| 4,093,341 | 6/1978 | Crick | 350/96.21 |
| 4,094,580 | 6/1978 | Cook et al. | 350/96.21 |
| 4,099,832 | 7/1978 | Warner, Jr. | 350/96.21 |
| 4,109,994 | 8/1978 | Chown | 350/96.21 |
| 4,123,139 | 10/1978 | Sandahl | 350/96.21 |
| 4,132,461 | 1/1979 | Jacques et al. | 350/96.20 |
| 4,142,777 | 3/1979 | Gauthier et al. | 350/96.21 |
| 4,158,476 | 6/1979 | McCartney | 350/96.21 |
| 4,161,347 | 7/1979 | Tardy | 350/96.21 |
| 4,181,402 | 1/1980 | Borsuk et al. | 350/96.21 |
| 4,192,575 | 3/1980 | Hodge | 350/96.21 |

FOREIGN PATENT DOCUMENTS

| 2602661 | 7/1977 | Fed. Rep. of Germany | 350/96.21 |
| 2602662 | 7/1977 | Fed. Rep. of Germany | 350/96.21 |
| 2735339 | 2/1979 | Fed. Rep. of Germany | 350/96.21 |
| 2847264 | 5/1979 | Fed. Rep. of Germany | 350/96.21 |
| 52-25648 | 2/1977 | Japan | 350/96.21 |
| 7509800 | 2/1976 | Netherlands | 350/96.21 |
| 2002141 | 2/1979 | United Kingdom | 350/96.21 |

OTHER PUBLICATIONS

Hawk et al., "Low Loss Splicing and Connection of. . . ", *Proc. of Photo-Opt. Inst. Eng.: Guided Opt. Commun.*, vol. 63, Aug. 1975, pp. 109–113.

Metcalf et al., "Dual Three-Rod Connector For Single Fiber Optics", *Applied Optics*, vol. 18, No. 3, pp. 400–401, Feb. 1979.

*Primary Examiner*—John D. Lee
*Attorney, Agent, or Firm*—Charles W. Helzer

[57] ABSTRACT

Optical fiber alignment mechanism comprising at least an optical fiber, at least three rigid members with a circular cross section, which are arranged to surround said optical fiber and of which each is in tangential contact with said optical fiber as well as with two other rigid members, and a plastic member molded in a plug like shape to contain said fiber and rigid members in lump, the outer surface of said plastic member allowing said rigid members to be exposed tangentially at least at three portions thereon.

37 Claims, 44 Drawing Figures

F I G. 18
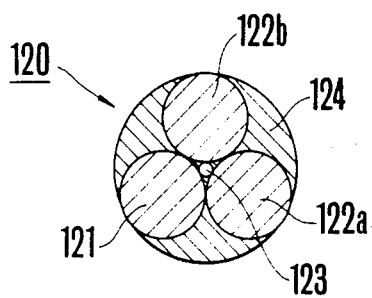
F I G. 19
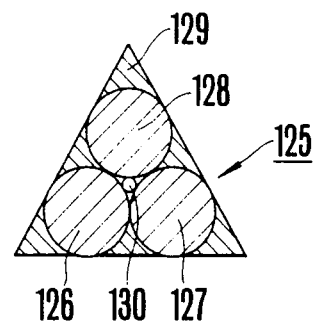
F I G. 20
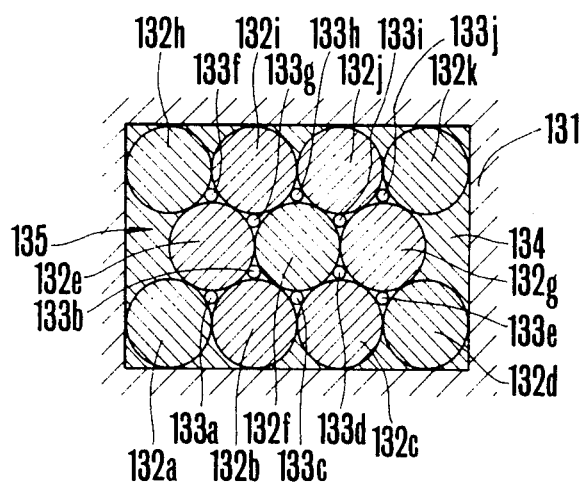

OPTICAL FIBER ALIGNMENT MECHANISM AND CONNECTORS USING THE SAME

BACKGROUND OF THE INVENTION

The present invention relates to optical fiber alignment mechanism and connectors using it.

Optical fibers have been widely known as suitable means for transmitting optical signals in optical communication. In optical fiber communication systems, however, the loss of optical energy has always been a subject of discussion. When light is transmitted through optical fibers, there is caused not only transmission loss due to the fiber characteristics but also connecting loss due to the fiber interconnection. This invention aims at elimination of the latter loss. In order to eliminate or minimize such connecting loss, fiber alignment has to be achieved with accuracy of micron order, and at the same time, one fiber end has to closely abut the other opposite fiber end. Further, optical fibers are usually thin lines having a diameter of 100 microns order, so that fibers themselves are fragile and their ends can be moreso. Accordingly, fiber ends have to be provided with the structure that is suitable for protecting and reinforcing them. In order to attain fine fiber alignment mechanisms there have been a lot of trials. However, they have not always been successful in providing an entire solution to the problem. In the most popular structure that has been proposed thus far, the fiber end is molded by using a plastic resin. This is simple and effective to some extent. As is known, however, when the melting plastic resin stiffens, it never fails to shrink. Therefore, any fine adjustment of fiber alignment before plastic molding is in vain due to such shrinkage. Accordingly, it is not possible to achieve fine fiber alignment readily and reliably by such a simple molding method as mentioned above.

Another example of the prior art will be seen in the U.S. Pat. No. 4,087,155 which discloses a connector for a single optical fiber. For the optical fiber alignment, the prior art connector utilizes a tricuspid interstice formed by three spheres with equal diameter. The end of the fiber is mounted in that interstice. The spheres are further mounted in an elongated cylinder member. This arrangement will result in good fiber mating with high accuracy, because the tricuspid interstice formed by 3 spheres is smartly utilized to mount the fiber therein. Three spheres are contained in the cylinder member and then, two of said cylinder members are inserted into a single sleeve for coupling. In such a structure, however, the fiber alignment would become impossible if two cylinder members should be deformed by some cause. In other words, when an off-center state occurs between the inner and outer diameters of the cylinder member, the center of the fiber inserted into the sleeve becomes off-axis relative to the sleeve center, thus also producing another off-axis state against the fiber coming from the opposite side of said cylinder member. In order to solve such an off-center problem as mentioned above, it is necessary to form said cylinder member with extremely high accuracy, thus resulting in expensive connectors.

Still another prior art connector will be seen in the article entitled "Dual three-rod Connector For Single Fiber Optics" by B. D. Metcalf et al, which is carried by Applied Optics Vol. 18, No. 3, page 400–401, issued on Feb. 1, 1979. In the connector disclosed therein, there are used two sets of rods. One set comprises 3 rods having identical diameters and the other also comprises 3 rods having an identical diameter but smaller than that of the former set.

In this prior art connector, there are used two groups of rigid rods, the first one of which consists of three rigid rods having an identical diameter while the second one consists of a plurality of rods having an identical but larger diameter than the rods of the first group. In the first rod group, said three rods are arranged to have a tricuspid interstice therebetween formed thereby, into which an optical fiber is inserted and held. A part of the resultant structure by the arrangement above is then further inserted into an insert ferrule of predetermined length and secured therein to form a plug, where said three rods work as insert rods. On one hand, a plurality of said larger diameter rods are arranged, for example, to form a hexagonal cross sectional pattern by using seven rods, and then fixed by binding them altogether by means of O-rings. The pattern creates six interstices therein, and each of them is used as a receptacle for the insert rods of said plug. In other words, the fiber alignment has to be made eventually within the interstice formed by the larger diameter rods. As a result, the fiber alignment comes to be dominated by the interstice state which depends on the compression mode of said O-ring or the like. Further, the head of said insert rods are not fixed together, thereby making it harder to insert said insert rods into said interstices. Still further, tangential contact between the rods in the interstice is easily broken by external force abnormally added thereto. Still further, when some twisting force is applied thereto, the fiber location in the insert rods is easily changed thereby.

SUMMARY OF THE INVENTION

Accordingly, a principal object of the present invention is to provide an optical fiber alignment mechanism for performing precise connection of optical fibers for use in optical communication systems and the connector utilizing said mechanism, by which accurate optical fiber alignment and connection are attained with minimized optical transmission energy loss.

Another object of the invention is to provide a simple and economical optical fiber alignment mechanism and the connector utilizing it.

Still another object of the invention is to provide an optical fiber alignment mechanism and the connector using it, by which there is attained excellent optical fiber interconnection that is stable and durable against repetition of mating and detaching the connector.

According to one aspect of the invention, for achieving the above object, there is provided an optical fiber alignment mechanism which comprises at least an optical fiber; at least three rigid members with a circular cross section, which are arranged to surround said optical fiber and of which each is in tangential contact with said optical fiber as well as with two other rigid members, and a molded plastic member formed in a plug like shape to contain said fiber and rigid members in assembled relation, the outer surface of said plug-like plastic member allowing said rigid members to be exposed tangentially at least at three portions thereon.

According to another aspect of the invention, there is provided the optical fiber alignment mechanism comprising at least an optical fiber; a plurality of rigid balls surrounding said optical fiber to be in tangential contact with it; and a plastic member formed in a plug-like shape to contain in assembled relation said fiber and balls. Said balls are in tangential contact with one another as well as with the outer surface of said plastic member, a part of each ball being exposed tangentially on said surface, with said balls being divided into a plurality of triangular triple-ball sets. The triangular triple-ball sets are stacked in parallel with a plane perpendicular to the axis of said fiber in such a manner that one triple-ball set takes a position twisted by 60° against two other sets on both its sides, and said fiber runs through the tricuspid interstice formed at the inside of said stacked triple-ball sets.

According to another aspect of the present invention, there is an optical fiber alignment mechanism comprising at least an optical fiber; two triangular triple-ball sets; a ring spacer; and a plastic member formed in a plug-like shape to contain in assembled relation said fiber, triple-ball sets and spacer, the balls in each of said triple-ball sets being in tangential contact with one another as well as with the outer surface of said plastic member. A part of each ball is exposed tangentially on said surface, said fiber running through the interstice formed at the inside of said triple-ball sets, and said ring spacer being axially arranged to intervene between two of said triple-ball sets.

According to another aspect of the invention there is provided an optical fiber alignment mechanism comprising a plurality of optical fibers, a plurality of rigid members surrounding each of said fibers, and a plastic member formed in a plug-like shape to contain in lump said fibers and rigid members, said rigid members being arranged in a plurality of layers and being in tangential contact with neighbour members. Each of said fibers running through the interstices formed by adjoining three rigid members and being in tangential contact therewith, and each rigid member belonging to the peripheral side layers of the rigid members being in tangential contact with the outer surface of said plastic member.

According to another aspect of the present invention there is provided an optical fiber alignment mechanism comprising at least an optical fiber; three rods surrounding said fiber, said rods being in tangential contact with said fiber as well as with each other; and a plastic member formed in a plug-like shape to contain in assembled relation said fiber and rods, each of said rods being tangentially exposed out of the side surface of said plastic member.

According to another aspect of the present invention, there is provided an optical fiber alignment mechanism comprising a plurality of optical fibers; a plurality of rigid members surrounding each of said plural fibers; and a plastic member formed in a plug-like shape to contain in assembled relation said optical fibers and rigid members. Said rigid members are arranged such that one of the members is positioned at center and the remaining members are annularly positioned around said center member, said center member being in tangential contact with all of said surrounding members, each of which is also in tangential contact with members on both its sides. Each of said fibers is surrounded by said center member and adjoining two of said annularly arranged members, and each of said annularly arranged members being in tangential contact with the outer surface of said plastic member.

According to another aspect of the invention, there is provided an optical fiber alignment mechanism comprising at least an optical fiber; a plurality of rigid members surrounding and being in tangential contact with said optical fiber; and a plastic member formed in a plug-like shape to contain in assembled relation said fiber and rigid members. Said rigid members consist of two rigid rods in tangential contact and adjoining rigid balls which are lined to be in tangential contact with both of said rigid rods, and said rigid rods and balls are exposed tangentially on the outer surfaces of said plastic member.

According to another aspect of the invention, there is provided an optical fiber alignment mechanism comprising at least an optical fiber; rigid members surrounding and being in contact with said optical fiber; and a plastic member formed in a plug-like shape to contain in assembled relation said fiber and rigid members. Said rigid members consist of a rigid rod and two rigid ball lines, each ball in said ball lines being in tangential contact with said rigid rods as well as with two balls on both its sides. Said fiber runs through the interstice formed in parallel with said rod by means of said two ball lines and rod, and said balls and rod are exposed tangentially on the outer surface of said plastic member.

According to another aspect of the invention, there is provided an optical fiber alignment mechanism comprising at least an optical fiber; a plurality of rigid members surrounding and being in tangential contact with said optical fiber; and a plastic member formed in a plug like shape to fix said fiber and rigid members together in assembled relation. Said rigid member consists of tangential and parallel adjoining two rigid rods and balls, each ball of which is lined along said two rods and is in tangential contact with said rods as well as with two balls on both its sides. Said rods and balls are tangentially exposed on the outer surface of said plastic member, and the plastic portion across said two rods is removed to form a key way for limiting the axial rotation of the mechanism.

According to another aspect of the present invention, there is provided an optical fiber alignment mechanism comprising a plurality of optical fibers; a plurality of rigid members surrounding each of said plurality of fibers; and a plastic member formed in a plug-like shape to fix said optical fibers and rigid members together in assembled relation. Said rigid members are arranged such that one of the members is positioned at center and the remaining members are annularly arranged around said center member, said center member being in tangential contact with all of said surrounding members, each of which is also in tangential contact with members on both its sides. Each of said fibers is surrounded by said center rigid member and adjoining two of said annularly arranged members, each of said annularly arranged members being in tangential contact with the outer surface of said plastic member. A plastic portion across adjoining two rods is removed to form a key way which is adapted to use in restricting the axial revolution of the mechanism.

According to another aspect of the invention, there is provided a connector comprising: two optical fiber plug means including a plug main body which comprises at least an optical fiber, at least three rigid members with a circle cross section which are arranged to surround said optical fiber and of which each is in tangential contact with said optical fiber as well as with two other rigid members. A plastic member formed by molding in a plug-like shape contains said fiber and rigid members in assembled relation, the outer surface of said plastic member allowing said rigid members to be exposed tangentially at least at 3 portions thereon. The connection is completed by a receptacle which comprises a resilient sleeve for receiving said two plug means on both its sides, a housing for containing said sleeve, and means for determining the position of said sleeve in said housing.

According to another aspect of the present invention, there is provided an optical fiber alignment mechanism comprising at least an optical fiber; at least three rigid members with a circular cross section which are arranged to surround said optical fiber and of which each is in tangential contact with said optical fiber as well as with two other rigid members. A plastic member formed by molding in a plug-like shape contains said fiber and rigid members in assembled relation with the outer side surface of said plastic member allowing said rigid members to be exposed tangentially at least at three portions thereon while the end face thereof also allows said rigid member to be exposed therefrom, and the optical fiber end being located at the inside a little from said rigid member surface exposed at the end face.

BRIEF DESCRIPTION OF THE DRAWINGS

Other and further objects, features and advantages of the present invention will be more fully understood from the description taken in conjunction with accompanying drawings, wherein:

FIGS. 18 and 19 are cross sectional views of plugs which are modified from the plug as shown in FIG. 16;

FIGS. 20, 21, 22 and 23 are diagrammatical representations for showing further modification of plugs as shown in FIG. 16 through FIG. 19;

DESCRIPTION OF THE PREFERRED EMBODIMENT

Figure 1:
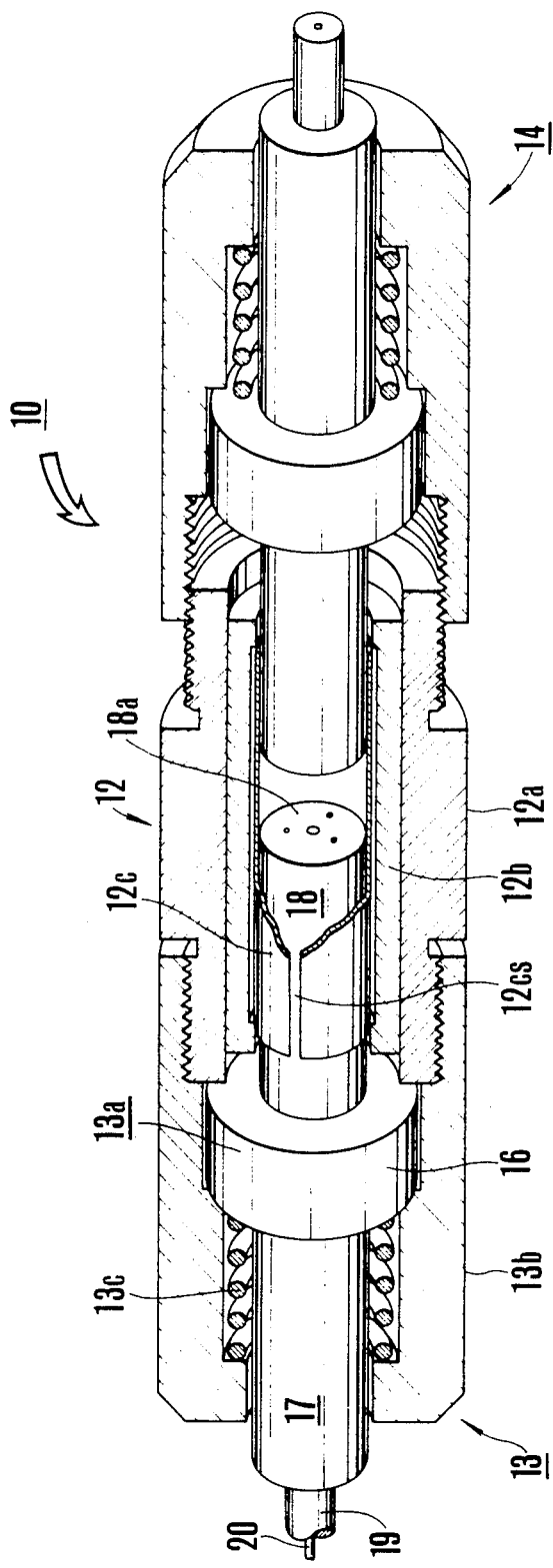
FIG. 1 is a perspective fragmentary sectional view of optical fiber alignment mechanism and the connector utilizing it according to the present invention.

FIG. 1 is a perspective fragmentary sectional view of the optical fiber alignment mechanism according to the invention and the connector utilizing it, especially the connector and plug combination for a single optical fiber. In the figure, a connector 10 comprises a main connector body 12 and plug means 13 and 14 which are inserted into said connector body 12 from both sides thereof. The connector body 12 consists of a cylindrical housing 12a, spacer or sleeve holder 12b contained in said housing 12a, and a slitted sleeve 12c which is held within said sleeve holder 12b. Both ends of said housing 12a are provided on their side surface with a thread portion for coupling to said plug means 13 and 14. Said sleeve 12c is formed of a resilient material showing spring action such as phosphor bronze, and is provided with a slit 12cs which is formed in its axial direction. Owing to existence of said slit 12cs as well as elasticity of the material, the sleeve 12c is able to firmly grasp the plug means 13 and 14 inserted thereinto.

The plug means 13 and 14 have an entirely identical structure, so that the following description will be made only about the plug means 13.

The plug means 13 comprises a molded plug 13a, a housing 13b containing said plug 13a, and a spring 13c which is housed in said housing 13b and is giving biasing force to said plug 13a so as to push it always toward the center of the connector 10. The molded plug 13a comprises a base 16 located at about its center, a guide cylinder 17 which extends in one direction from one side of said base 16 to project out of said housing 13b, and a cylindrical plug body (hereinafter merely called plug) 18 which extends in the opposite direction from the other side of said base 16 and is to be inserted into sleeve 12c. Said base, guide cylinder, and plug are molded together in an integral body to form the entirety of said molded plug 13a. A jacket 19 is inserted to said guide cylinder from its one end to cover the optical fiber 20. The tip of the inserted jacket reaches said base 16. The optical fiber 20 is further extended up to the end face of said plug 18. In this case, the optical fiber 20 is aligned on the axis of the molded plug 13a by arrangement as explained later, where rigid precision members are adjoiningly disposed to surround the fiber 20, thus the end of the fiber always comes to appear at the center of a circular plug end 18a.

Figure 2A:
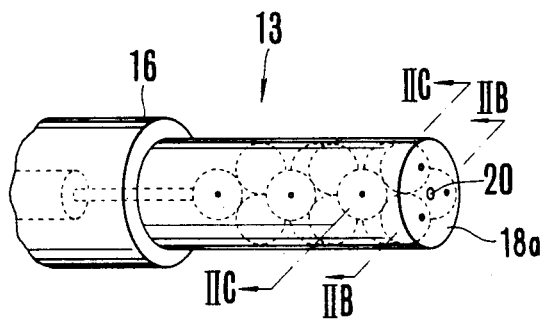
FIG. 2A is a perspective view of a plug body as shown in FIG. 1.
Figure 2B:
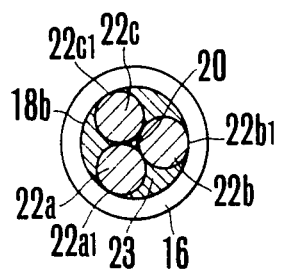
FIGS. 2B and 2C are cross sectional views taken along IIB—IIB and IIC—IIC lines, respectively of FIG. 2A.
Figure 2C:
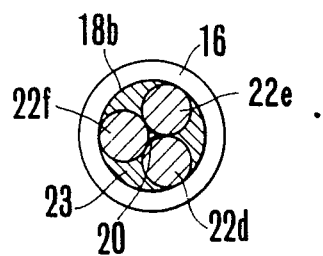

FIGS. 2A, 2B and 2C are diagrammatical representations to show the structure of the plug 18 in more detail. As shown in these figures, said plug 18 contains 3 rigid precision balls with an identical diameter, which are disposed around the fiber 20 to be in tangential contact with it. The rigid balls are made of a hard material such as steel, high quality hard glass, industrial ruby or sapphire. With optical fibers having a diameter of 0.15 mm, rigid balls having a diameter of about 1 mm are used. Rigid balls having such diameter are readily and economically obtainable with high accuracy by means of the current technology. Three balls 22a, 22b and 22c are adjoiningly molded in the plug 18 to be exposed respectively at points where each ball is in contact with the circumscribed surface 18b as well as the end 18a of said plug 18. Such points are indicated by reference numerals 22a1, 22b1 and 22c1 in FIG. 2B as well as by 3 small circles on the end face of the plug 18 in FIG. 2A. The plug end 18a is finished by polishing to obtain a fine flat surface which is suitable for closely abutting on the counter plug end. In molding the plug 18, it is desirable to use plastic material of the type which has a low viscosity in fluid form, such as epoxy resin. The plug 18 further contains another triple-ball set consisting of balls 22d, 22e and 22f, which are stacked along the axis of the plug 18 toward said base 16. These balls are also surrounding and in tangential contact with the optical fiber 20 in the same manner as said triple-ball set 22a, 22b and 22c. The adjacent triple-ball sets are twisted to each other by 60° about the axis of the plug 18 and make multi-tangential contacts with the circumscribed surface 18b. This relationship will become more clear when referring to FIGS. 2B and 2C. Balls 22d, 22e and 22f are kept in tangential contact with the surface 18b of the plug 18 in the same manner as said balls 22a, 22b and 22c. Still another triple-ball set is disposed next said triple-ball set 22d, 22e and 22f with the same relationship that is kept between said two triple-ball sets, one consisting of balls 22a, 22b and 22c, and the other including balls 22d, 22e and 22f. By repeating the steps as described above, triple-ball sets are disposed in the plug as shown in FIG. 2A, where six triple-ball sets are seen.

In the triple ball arrangement as explained above, the optical fiber 20 runs through the center tricuspid interstice of each triple-ball set. This means that the fiber 20 is located at the center of an equilateral triangle, of which vertex corresponds to each center of three balls forming the triple-ball set. The fiber location, therefore, is kept stably against shrinkage of the plastic resin 23 which occurs when it stiffens in the mold. When the plug 18 is inserted into the connector, its surface 18b is firmly grasped in said sleeve 12c. On one hand, the shrinkage of the resin 23 can give no influence to the triple-ball set geometry but to expose at a multiplicity of single points the tiny sphere surface of each ball. Thus, the substantial and active surface 18b is accurately determined by the rigid precision balls. This results, accordingly, in the accurate coincidence between the fiber and sleeve centers when the plug is grasped by the sleeve 12c.

Further, according to the plug construction as mentioned above, the sphere surface of the rigid ball exposed out of the surface 18b has a higher hardness than other plastic member portions. This means that the plug 18 is provided with an excellent outer surface which is so hard and so resistant to wear that it readily withstands repetitive attachment to and attachment from the connector.

Still further, it is apparent that the present plug construction as mentioned above is effective not only for location of the fiber 20 in the plug 18 but also for the protection and reinforcement of the optical fiber, especially its end.

The plug structure as mentioned above will be attained by the manufacturing steps as shown in FIGS. 3A, 3B, 3C and 3D. In these figures, the guide cylinder 17 in FIG. 1 is omitted for simplifying the explanation. Also for further simplification of the explanation, the manufacturing steps will be described in terms of the single-fiber plug structure.

First, there is prepared a mold 30 which has a form accurately corresponding to the outer dimension of an aimed plug. The mold 30 comprises two portions. One is a deeper cylinder portion 30a which defines the outer surface of the plug, and the other is a cylinder portion 30b which is shallower than said cylinder 30a but has a larger diameter than said cylinder 30a. The cylinder 30a is processed to have an accurate inner diameter of 2.155 times ball diameter arranged therein.

Figures 3A, 3B:
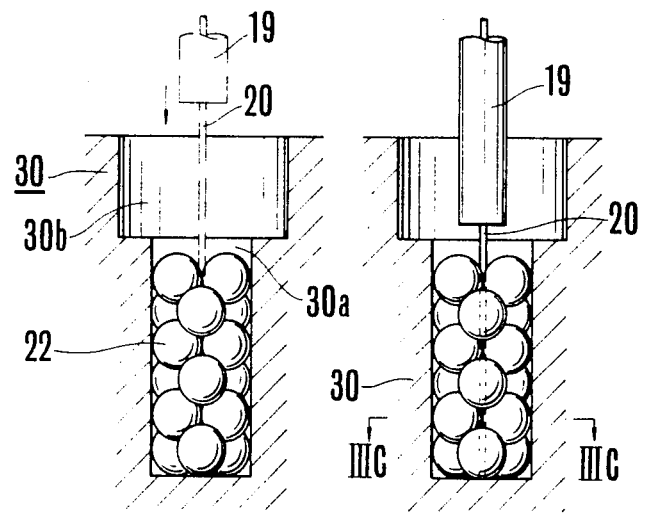
FIGS. 3A, 3B, 3C and 3D are diagrams for showing the process of molding the plug body in FIG. 2A.
Figures 3C, 3D:
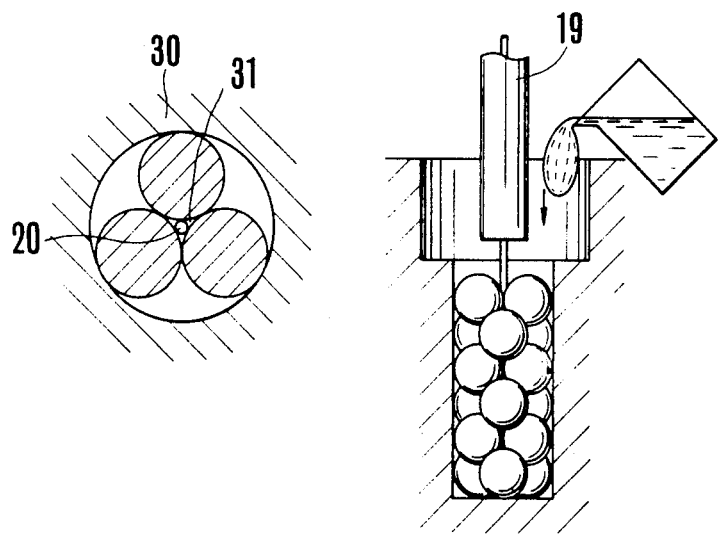

To obtain the precision balls, it is helpful to use the knowledge on commercial bearings. Rigid balls for use in bearings are being manufactured with a high accuracy of 0.5–0.2 μm. Moreover, they are obtainable at a low cost in spite of such a high accuracy. When at least eighteen rigid balls 22 having an identical diameter are cast into said deeper cylinder portion 30a, they are naturally accumulated in the fashion that 3 balls make one triple-ball set and each set is twisted about the mold axis by 60° against the set immediately before it. FIG. 3A shows 6 triple-ball sets stacked in the cylinder 30a. In this state, each ball in triple-ball sets comes to be in tangential contact with the inner wall of the cylinder portion 30a or to be very near it. Then, the bared optical fiber 20 extended from the plastic jacket 19 is inserted into the center tricuspid interstice 31 of the top triple-ball set (FIG. 3C). Said interstice 31 has a form like a slightly deformed triangle. The state after fiber insertion is shown in FIG. 3B. Then, a melting plastic resin such as an epoxy resin is poured into cylinder portions of the mold 30 as shown in FIG. 3D. When the resin poured in is completely stiffened, the molded plug is removed out of the mold 30, and then it will receive buffing or polishing, if necessary.

Figure 4:
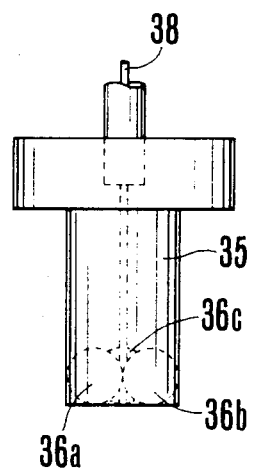
FIG. 4 is a diagram showing a modified embodiment of this invention wherein a set of rigid ball members are used.

FIG. 4 shows a modified embodiment of the invention, wherein only a single triple-ball set of balls 36a, 36b and 36c is molded in the plug 35. In this case, the fiber 38 may require auxiliary means (not shown) for keeping the fiber accurately at the center of the plug until the molding is finished. After the resin has been hardened, however, the fiber is firmly held at the end of the plug 35 by hardened resin 39. If the plastic resin should shrink during its stiffening, the force caused by shrinkage would be blocked by the rigid balls. Therefore, less force would reach the fiber.

Figure 5:
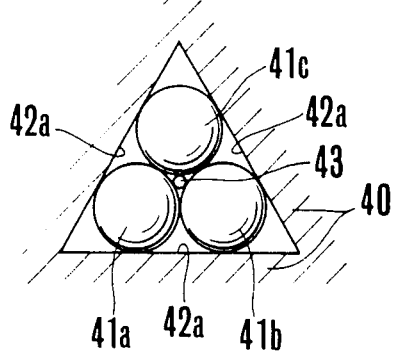
FIG. 5 is a cross sectional view of a further modified plug body of the invention.

FIG. 5 shows another modified embodiment of this invention. A mold 40 for the modified plug has such a cross section of an equilateral triangle that a triple-ball set of balls 41a, 41b, and 41c is inscribed therein. Each ball is in tangential contact with two sides of said equilateral triangle, so that it will be exposed at two points on its sperical surface when the resin shrinks. A reference numeral 43 designates the optical fiber which is in tangential contact with each of said balls in the interstice formed therebetween.

In the structure above, the number of points exposed due to resin shinkage is increased twice compared with the plug having the circumferential surface, thus the fiber location against the connector becomes more accurate.

Figure 6:
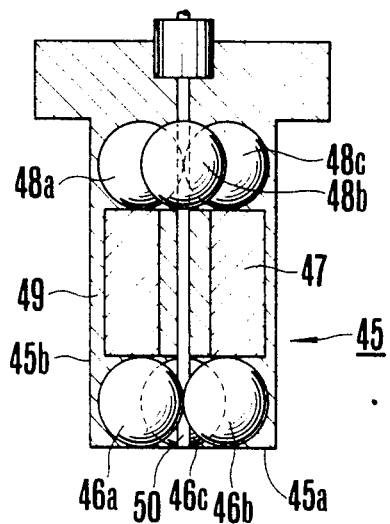
FIG. 6 is a sectional view of the plug constructed according to the invention and modified to include an intermediate spacer.

FIG. 6 shows another modified plug structure embodying the present invention. In the figure, the plug 45 comprises rigid balls 46a, 46b and 46c having a same diameter and being in tangential contact with the plug end 45a as well as with the plug outer surface 45b; a cylindrical spacer 47 in provided, of which the bottom is in tangential contact with each of said three balls 46a, 46b and 46c while the upper face thereof is in tangential contact with each of another three balls 48a, 48b and 48c. The optical fiber 50 runs through one interstice formed by the triple-ball set 48a, 48b and 48c, the hollow portion of said spacer 47 and the other interstice formed by the other triple-ball set 46a, 46b and 46c to arrive at the end face 45a. The plastic member 49 which is molded to define the plug contour contains in an integral structure said triple ball sets, spacer and the optical fiber. With this structure, the fiber is made parallel with the outer surface of the plug the same as shown in FIG. 2. Further, the fiber is accurately located at the top and bottom portion of the plug, thereby providing a lengthy plug without spoiling the accurate fiber location.

Figure 7:
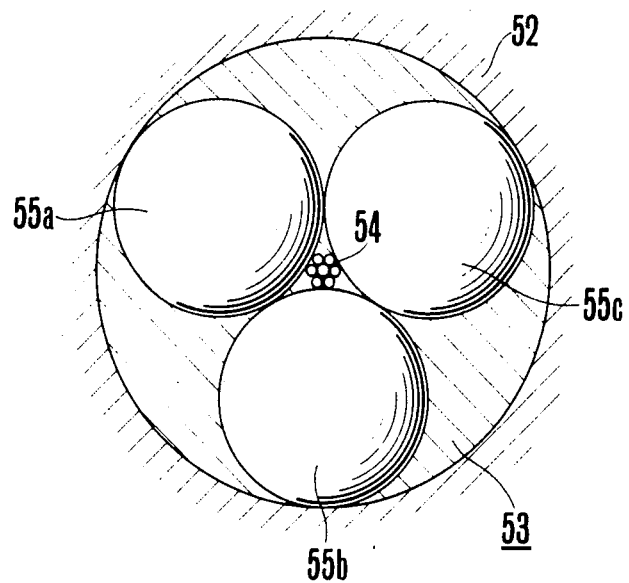
FIG. 7 is a sectional view of a plug constructed according to the present invention, in which a plurality of optical fibers are held at a center tricuspid interstice.
Figure 8A:
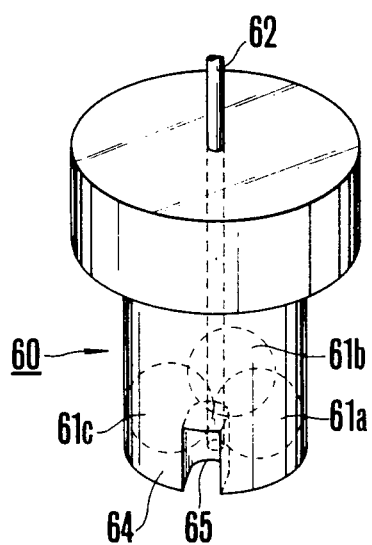
FIG. 8A is a perspective view of a plug constructed according to the invention, which is provided with means for limiting its angular position against the connector.
Figure 8B:
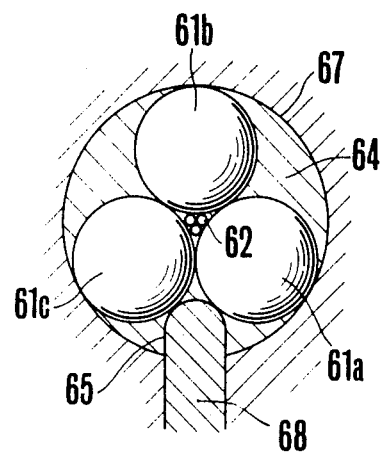
FIG. 8B is a cross sectional view of the plug as shown in FIG. 8A, when taken along a plane in parallel with the plane including the centers of 3 spheres.

FIG. 7 shows another embodiment of this invention, in which a group of optical fibers is handled as a single optical fiber. Said group of the fibers is formed by binding a plurality of fibers closedly so as to make its cross section axially symmetric. In the figure, reference numeral 54 designates a group of fibers while 55a, 55b and 55c designate identical rigid balls selected in view of the diameter of said fibers 54. In this example, seven fibers are bound together. The bound fiber will have an almost complete symmetric cross section because unit fiber diameter is manufactured with a high accuracy. Therefore, when the group of fiber is inserted into the interstice formed by said 3 rigid balls, the center of said group of fibers accurately coincides with the common center of the triple-ball set. In this case, the outer surface of said group of fibers comes in tangential contact with said balls. When two plugs having the structure as mentioned above are inserted into the connector as shown in FIG. 1, each of said group of fibers in one plug must correctly meet each of the counter group of fibers in the other plug. Therefore, plug insertion to the connector has to receive limitation with respect to its angular position about its axis. The embodiment as shown in FIGS. 8A and 8B is provided with a limiter which restricts the plug angular position against the connector. In the figures, a reference numeral 60 designates a cylindrical plug, 61a, 61b and 61c identical rigid balls molded in said plug body, and 62 an optical fiber group similar to 54 of FIG. 7 inserted into the interstice formed by said three balls. The upwardly extended portion of the fibers is usually covered by the jacket (not shown). A reference numeral 64 designates a molded plastic member. Its outer side surface constitutes a circumscribed surface to said three balls and also its end face constitutes a tangential surface to them. A reference numeral 65 denotes a key way which is formed by partially breaking away a side portion of said plastic member 64 including a part of its end portion. The structure as described above is attained by using a mold 67 as shown in FIG. 8B. The mold 67 has a core inwardly projected in the radial direction. Two balls 61c and 61a are kept in tangential contact with said projected core. After the arrangement above, a melting plastic material is poured into the mold, thereby attaining the plug structure with a key way. With this structure, the key way comes to always take a constant position with respect to the cross sectional pattern of the fiber group. The connector sleeve for receiving the above plug with the key way 65 is provided with a guide pin corresponding to said key way. Two plugs, therefore, are mated in the sleeve keeping their accurate and constant angular position to the sleeve, thereby assuring that sectional fiber elements of both plugs precisely coincide with each other.

Figure 9A:
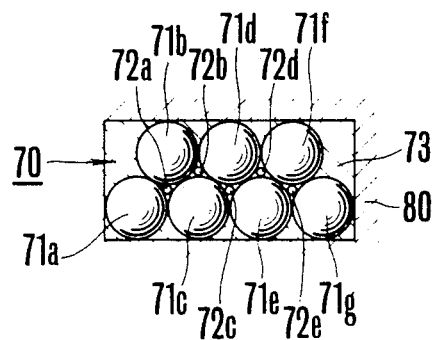
FIGS. 9A and 9B are two kinds of cross sectional views of a parallelepiped plug constructed according to the invention, which contains a plurality of rigid ball members and optical fibers.
Figure 9B:
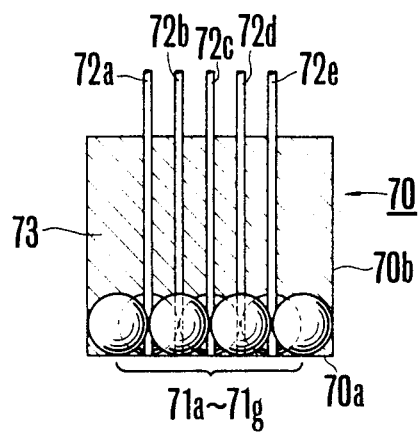

FIGS. 9A and 9B show another multifiber plug according to the invention. In the figure, a reference numeral 73 designates a plastic member which is molded by using a rectangular mold 80 to form a plug 70. The plastic member contains seven balls 71a through 71g and five optical fibers 72a through 72e, which are molded in lump therein. In the mold, said balls are arranged to come into tangential contact with each neighbour, and also with the end face 70a as well as with the side face of said plastic member 70. Each of fibers 72a through 72e is inserted into each tricuspid interstice formed by adjacent three balls in tangential contact. In this example, rigid balls having an identical diameter are arranged in a single layer in parallel with said end face 70a. However, balls may be stacked to form a multilayer ball arrangement. In this case, after completion of arranging the first ball layer and fibers, preliminary resin pouring is performed to the extent that balls are immersed into the resin a little over half their height. When the resin stiffens, the balls and fibers are fixed precisely at aimed places. Then, necessary balls are added into the mold to form a multilayer ball arrangement by using the fibers fixed at their one end as guide rails for shooting additional balls. Further, instead of the multilayer ball arrangement described immediately above, the plug structure utilizing spacer and spaced-above balls, as shown in FIG. 6, may be adopted when multifiber location has to be attained over the long span of the plug.

In the embodiment as mentioned above, there is no need to provide the key way as shown in FIG. 8 because the effective plug dimension with a rectangular cross section is precisely determined by the total dimension of precision ball assembly.

Figure 10:
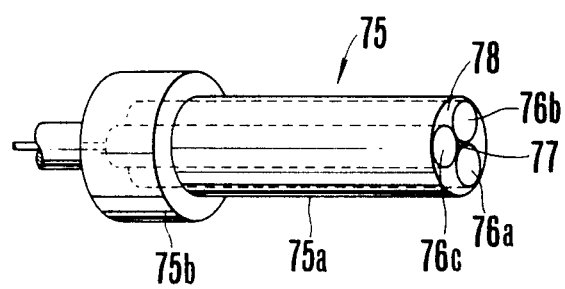
FIG. 10 is a perspective view of another form of plug constructed according to this invention, where rigid rod members are used instead of rigid balls.

FIG. 10 shows still another embodiment of the invention, in which rigid rods are utilized instead of rigid balls. In the figure, a plug 75 comprises three cylinder rods 76a, 76b and 76c, an optical fiber 77 running through the tricuspid interstice formed by said rods and a plastic member 78 molded to contain in lump said rods, fiber and a base portion 75b. Said plastic member 78 generally defines the contour of the plug body. In the plug, said rods are in tangential contact with each other and also with said fiber running through said interstice. Further, each of said rods makes a tangential contact against the outer surface of the plug. These tangential contact lines becomes slightly exposed when the resin poured shrinks during its stiffening, thus the effective diameter of the plug being free from resin shrinkage. Rods may be made of steel, high quality glass, industrial ruby or sapphire etc. Rods are precise right cylinders. Therefore, when a plurality of rods having an identical length are bound together, the resultant structure comes to have an end face entirely perpendicular to its side surface, thus attaining excellent fiber location as well as abutment between two plugs as constructed above. Advantage of using rods is that the number of parts can be decreased in comparison with the rigid ball arrangement without spoiling precise fiber location.

Figure 11A:
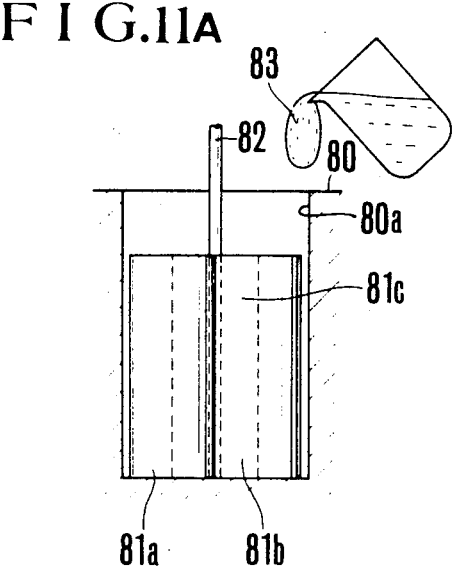
FIGS. 11A and 11B are diagrammatical representations for explaining the process of manufacturing the plug as shown in FIG. 10.
Figure 11B:
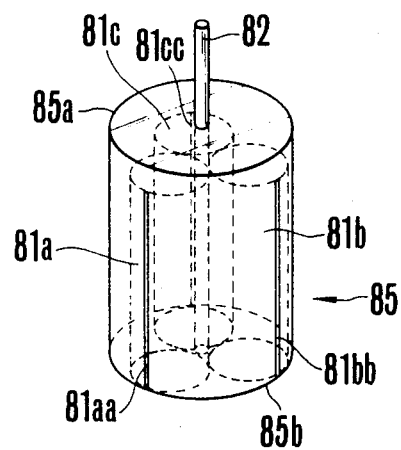

The method of manufacturing the plug utilizing rods with an identical dimension will now be described by referring to FIGS. 11A and 11B. In the figures, however, the base portion of the plug means is not shown for simplifying the explanation.

First, identical cylindrical rods 81a, 81b and 81c are placed in the cylindrical cavity 80a of a mold 80. In this state, three rods are kept in tangential contact with one another, and each rod is also kept in tangential contact with the inner wall of said mold cavity or kept very closely. Of course, rods used in this process are to be right cylinders, each of them having a precisely processed end perpendicular to its axis. Then, an optical fiber is inserted into the tricuspid interstice formed among the rods until it reaches the bottom of said mold cavity. The inserted fiber is kept correctly vertical within the interstice against the cavity bottom. Then, a melting plastic resin is poured into the mold by keeping said cavity bottom entirely horizontal. When the plastic resin stiffens, the rods and fibers are fixed together in lump and then, the molded plug is removed from the mold 80. The result is a plug 85 as shown in FIG. 11B. In this figure, as mentioned above, the base portion 75b is not shown. The plug body 85 has a surface 85a of which a cross section is about a circumscribed circle and tangential contact portions between said surface 85a and rods 81aa, 81bb and 81cc comes to be exposed a little on said surface 85a. The end face 85b of the plug 85 may be finished by polishing or buffing, if necessary in order to obtain a flat face perpendicular to the plug axis. As explained before, the plastic molded portion is not always stable on its dimensional accuracy. However, a total diameter of the structure using rigid rods made of hard materials like steel, glass etc. is kept entirely stable, because the effective outer surface of the plug has a very stable diameter including tangential contact lines between rods and said surface 85a. Therefore, the fiber axis and the effective plug center axis will coincide with each other regardless of plastic resin shrinkage. Accordingly, when two plugs as constructed above are mated within the connector as shown in FIG. 1, their axes are precisely aligned with each other with the help of tangential lines 81aa, 81bb and 81cc. In other words, the contact between the connector sleeve and the plug is made only through said 3 tangential lines, which are on rigid rods of hard materials, for instance steel or glass. Therefore, the plug can stand repetition of mating with and detaching from the connector without inviting decrease of alignment accuracy and spoiling stable connection. Further, use of 3 rigid rods improves the mechanical strength of the plug to a great extent, thus the connector can be more miniaturized than prior art connectors.

Figure 12:
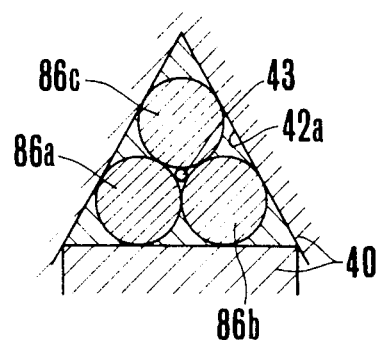
FIG. 12 is a cross sectional view of a plug modified from that of FIG. 10.
Figure 13:
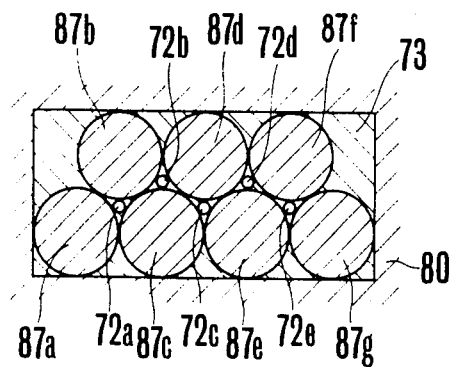
FIG. 13 is a cross sectional view of a modified form of plug containing a plurality of optical fibers and rigid rod members.

FIGS. 12 and 13 show other embodiments of the invention, in which the cross section of the plug is formed in an equilateral triangle shape or a rectangle shape. In these embodiments, rods are used otherwise, they generally corresponding to the embodiments as shown in FIGS. 5 and 9A, in which rigid balls are used, so that detailed explanation is believed unnecessary. In the figures, except reference numerals 86a, 86b, 86c, and 87a, through 87g for rigid rods in place of both, like portions shown in FIGS. 5 and 9A bear like reference numerals to those used in FIGS. 12 and 13.

Figures 14A, 14B:
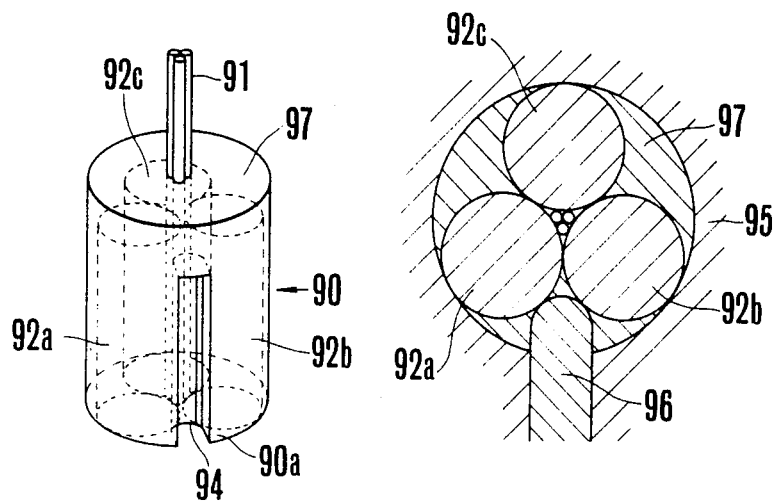
FIGS. 14A, 14B and 15 are diagrammatical representations for showing another modified form of plug which contains a plurality of rigid rod members and optical fibers, and is provided with means for limiting its angular position against the connector.

FIGS. 14A and 14B show still another embodiment of this invention in which a group of optical fibers is handled as a single optical fiber. The group of fibers is formed by binding a plurality of fibers together so as to make its cross section axially symmetric. In these figures, a reference numeral 90 designates a cylindrical plug, 91 a group of optical fibers, and 92a, 92b and 92c three adjoining cylindrical rigid rods having an identical dimension. In this embodiment, three optical fibers are used to form a group of the fibers. Each fiber has a very high accurate diameter. Therefore, when a plurality of such fibers are bound together to form a multi-fiber cable, its cross section has almost complete and axial symmetry. Accordingly, when such a group of fibers is inserted into the tricuspid interstice formed among said three rods, it is possible to attain excellent coincidence between the axis of the fiber group 91 and the common axis of said triple-rod set. However, when two plugs as constructed above are inserted into the connector as shown in FIG. 1, their angular position around their axis has to be restricted to achieve precise fiber to fiber alignment in the connector. A reference numeral 94 designates a key way which is formed by breaking away a part of the plug side surface including a part of the end face 90a. The structure as described above is attained by using a mold 95 as shown in FIG. 14B. The mold 95 is provided with a core 96 which is projected from the side surface of the mold with a predetermined height and is wedged into the bottom of the mold with a predetermined depth. Three rods are arranged in the mold such that two of them (92a, 92b) come into tangential contact with said core at its sides respectively. Then, the group of the fibers 91 is inserted into the tricuspid interstice formed at the center portion of the triple-rod set until it arrives at the bottom of the mold. After the rods and fibers are arranged in the mold, a melting plastic resin such as epoxy is poured thereinto. When the resin hardens, a plug having a key way at a predetermined position, is provided as shown in FIG. 14A. When a connector sleeve is provided with a guide pin corresponding to said key way, the plug angular position against the sleeve is precisely determined, thus fine fiber to fiber alignment in the sleeve is obtained.

Figure 15:
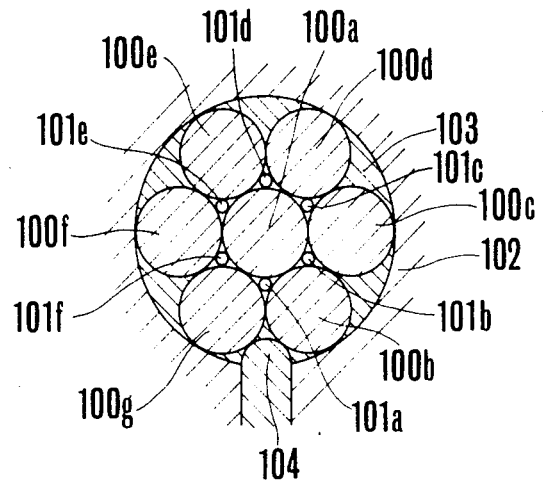

FIG. 15 shows a rod and fiber arrangement in the mold for providing another embodiment of the present invention. First, there are provided seven rigid rods 100a through 100g which have an identical dimension. The rod 100a is located at the center of the mold 102. Another six rods 100b through 100g are arranged around said center rod 100a such that each of rods 100b through 100g are in tangential contact with the center rod 100a and also with rods at its both sides. Six fibers 101a through 101f are inserted into six interstices respectively, which are formed at each center portion of the triple-rod set consisting of said center rod 100a and two adjacent rods. The fibers are extended to reach the bottom of the mold. In this arrangement, two rods, for example 100g and 100b, are brought into tangential contact with a core 104 for a key way. Finally, a melting plastic 103 is poured into the mold.

In the embodiments shown hereinbefore, only rigid balls or rods are used as rigid members in each embodiment. However, when the rods are closely arranged as shown thus far, it is not so easy to insert very thin optical fibers into interstices formed therebetween because of the friction between the rod surface and the fiber. The longer the rod length is, the harder the fiber insertion becomes. Further, in case of arrangement by rod only, incomplete plastic molding happens in the interstice where the fiber is located. On one hand, the ball arrangement allows the melting plastic resin to extend into the interstices between balls better, thus the difficulty encountered in the rod arrangement can be considerably obviated. However, the resulting plug structure using balls only possesses less strength in its axial direction and its dimension is not always kept unchanged for a long time.

In the following paragraphs, there will be discussed embodiments of the invention wherein combinations of rigid precision rods and balls are utilized.

Figure 16:
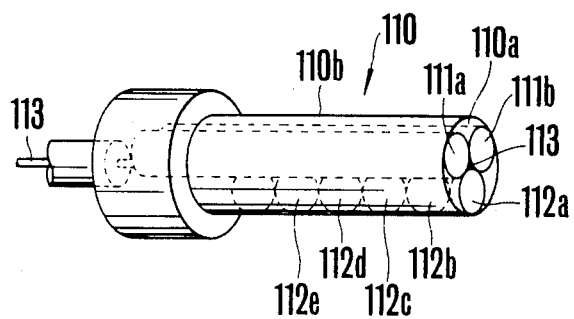
FIG. 16 is a perspective view of another modified form of end structure in which rigid ball and rod members are used together.

FIG. 16 shows embodiment of this invention, in which a combination of rigid rods 111a and 111b, and rigid balls 112a through 112e, is used. In this case, the end face 110a of the plug 110 includes the ends of the rods 111a and 111b and the half of rigid ball 112a. These rods and balls are in tangential contact with one another, and the tricuspid interstice formed by them allows the fiber to run therethrough. The fiber is also in tangential contact with the rods and balls. The general shape of the plug body is defined by the plastic member 114 molded to contain fiber, balls and rods in an integral structure. The outer surface of said plastic member is in tangential contact with said rods 111a, 111b, and balls 112a through 112e.

Figure 17A:
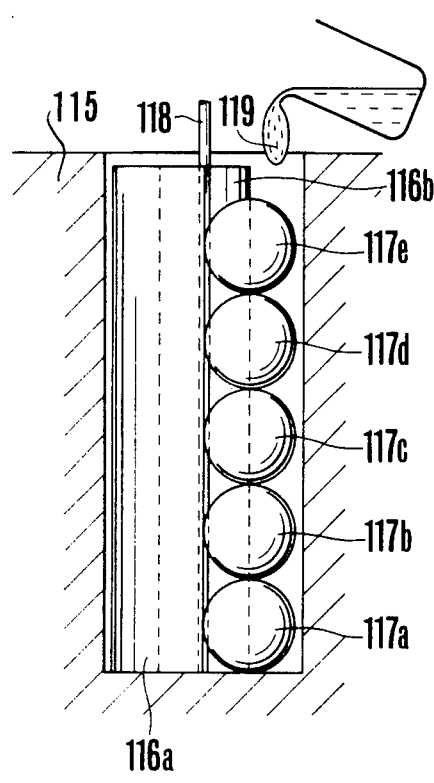
FIGS. 17A and 17B are diagrammatical representations for use in explaining the process of manufacturing the plug as shown in FIG. 16.
Figure 17B:
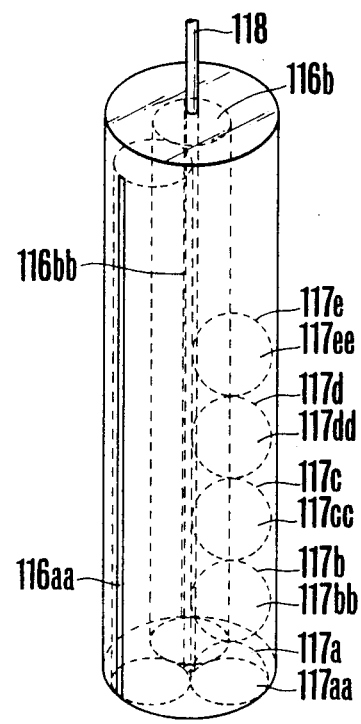

FIGS. 17A and 17B show the procedure for manufacturing the embodiment as shown in FIG. 16. First, two rigid rods 116a, 116b and five rigid balls 117a through 117e are placed in a mold 115. Then, an optical fiber 118 is inserted into the interstice which is formed by said two rods and five balls. The fiber insertion is continued until the fiber top reaches the bottom of the mold. After arrangement of the fiber, rods, and balls, a melting plastic resin such as epoxy resin is poured into the mold. When the plastic resin stiffens, the molded plug is taken out of the mold and its end is finished until the ball 117a becomes about half. FIG. 17B shows the plug after it has received such an end finish work. Tangential contact lines or points between rods or balls and the plug outer surface are shown by reference numerals 116aa, 116bb, 117aa, 117bb, 117cc, 117dd and 117ee.

In the embodiment above, five balls are used but the number of the ball is not to be limited to this example. For example, a single ball can be effective. In such case, the optical fiber is initially proceeded along the valley formed by two rods and then inserted into the interstice formed by two rods and one ball.

FIG. 18 is a cross sectional view of a further modified plug constructed according to the invention. In this embodiment, the plug 120 comprises a rigid rod 121, two rigid balls 122a and 122b, an optical fiber 123 which is inserted into the tricuspid interstice formed by said rod and balls and is in tangential contact with each of rod and balls, and a plastic member 124 molded to determine the contour of the plug. A part of each ball above and also a part of the rod are tangentially exposed on said outer surface of the plastic member 124.

FIG. 19 shows another modified embodiment of this invention. Combination of rigid balls and rods is the same as that shown in FIG. 16 or FIG. 18, and only the cross section of the plug is changed to form a triangle. In the figure, a reference numeral 126 designates a rigid rod, 127 a rigid ball, 128 a rigid rod or ball, 129 a plastic member, and 130 an optical fiber.

FIG. 20 shows still another embodiment with a multifiber arrangement according to this invention. For forming the structure of this embodiment, first, 11 rigid rods and balls (132a through 132k) are arranged in the rectangular space of a mold 131. Then, 10 optical fibers 133a through 133j are located in 10 interstices formed by said rods and balls. Using only balls makes it so hard to attain this arrangement while use of only rods makes it difficult to insert fibers into interstices. Accordingly, the multifiber arrangement as shown in FIG. 20 is readily obtained with mechanical strength only when a rod and ball combination is utilized. The outer dimension of the resultant mold is accurately determined by the entire dimension of stacked precision rods and balls, so that two plugs are completely aligned. A reference numeral 134 designates a plastic member which defines the contour of a plug 135. Rods and balls in tangential contact with the outer surface of said plastic member are tangentially exposed thereon. In this embodiment, the location of rods or balls is a matter of selection.

Figure 21:
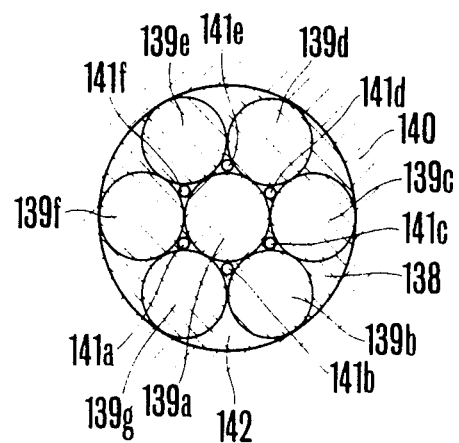

FIG. 21 shows another embodiment of the present invention. For achieving the structure of this embodiment, there is placed in a mold 140 rigid balls and rods (139a through 139g) as well as optical fibers 141a through 141f. Rod and ball location is also a matter of selection the same as in the embodiment of FIG. 20. A plastic member 142 determines the outer surface of a plug 138. Rods and/or balls are tangentially exposed on said outer surface of the plastic member the same as in the embodiments thus far.

Figure 22:
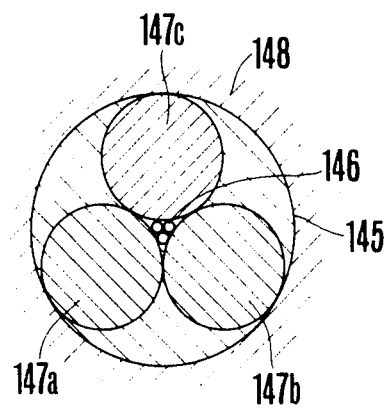

FIG. 22 shows another embodiment of this invention, in which a group of fibers is handled as a single optical fiber cable. For attaining the structure as shown in this figure, first, rods and balls (147a and 147c) are arranged in the cylindrical space of a mold 148, and a group of fibers 146 is inserted into the tricuspid interstice which is formed by rods and balls in tangential contact with one another. In this arrangement, the outer face of said group of fibers comes to be also in tangential contact with said balls and rods. Then, a melting plastic resin is poured to contain said fibers, rods, and balls in an integral structure. The optical fibers used here have an accurate diameter, so that when they are bounded, their cross section becomes of almost complete and axial symmetry. Thus, the multifiber plug is attained with accurate fiber location.

Figure 23:
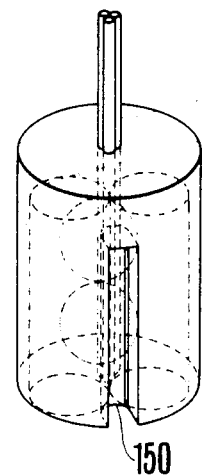

When it is needed that plug such as shown in FIGS. 16 through 19 have to be restricted on their angular position about its axis, there is provided a key way 150 as shown in FIG. 23, which is formed by breaking away a part of the side portion of the plug including a part of its end. The method of forming such will be understood from the description previously made in connection with embodiments as shown in FIGS. 8A and 8B as well as in FIGS. 14A and 14B.

FIGS. 24 through 30 shows further modified embodiments of the present invention, which can provide accurate alignment against the connector and are provided with means for limiting their axial angular position.

Figure 24:
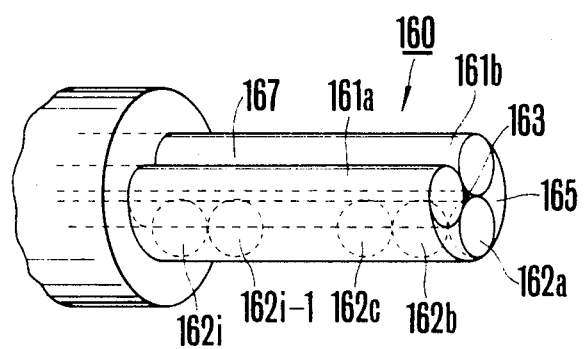
FIGS. 24, 24A and 25 are diagrammatical representations of plugs having a key way.
Figure 24A:
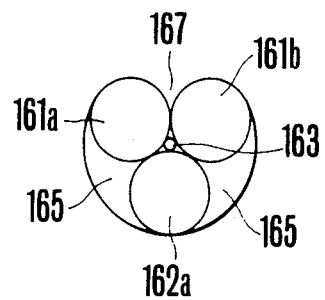

FIG. 24 shows the embodiment with a single optical fiber, which is obtained by slight modification of the plug shown in FIG. 16. In order to produce the plug 160, first, rods 161a, 161b and balls 162a through 162a, all of which have an identical diameter, are arranged in the cylindrical space of the mold (not shown). Then, an optical fiber 163 is inserted into the interstice formed between said rods and balls. The fiber, rods and balls are in tangential contact with one another. After the arrangement above, a melting plastic is poured into said mold (not shown) to fix the entirety of the arrangement. When the plastic resin hardens, the molded structure is removed from the mold and receives a predetermined process for finish. In this process, first, the end of the plug is polished until the rigid ball 162a becomes a half ball. The resultant structure becomes the same as obtained in FIG. 16. Second step is to remove the plastic resin only bridging across two rods 161a and 161b. The portion created by this step provides a key way 167 for limiting the plug angular position around its axis. FIG. 24A is a cross sectional view of the plug as shown in FIG. 24, from which the shape of the key way 167 will be more clearly understood. According to the structure above, the outer surface of the plug 160 is in tangential contact with said rods (161a, 161b) as well as with balls (162a through 162i), so that the plug position in the connector sleeve is accurately determined by two rods and balls and at the same time the relative position between the fiber and key is also accurately determined. Further, the coincidence between the plug center and the fiber's is achieved with high accuracy. Such an excellent optical fiber location and alignment mechanism is owed to the accurate process and stable nature of the basic materials such as rigid balls and rods which are made of steel, high quality hard glass, industrial ruby, sapphire, etc. For instance, the materials for use in manufacturing commercial bearings are processed with an error of less than 1 µm, so that the structure is obtained with accurate dimension when such precision basic materials are closely arranged. The plastic member 165 is used for just fixing the rod and ball arrangement together, so that the dimensional requirement for it is not so severe. Generally, the plastic material shrinks when it hardens. Consequently, the outer surface of the plastic allows rods and balls to become partially exposed. Thus, the effective outer diameter of the plug comes to be determined by the arrangement of precision rods and balls. This is same for the structure using only balls or only rods, but in the present embodiment, a combination of balls and rods is used to improve the strength of the resultant structure and also to make the plastic resin adequately strong throughout the structure.

Figure 25:
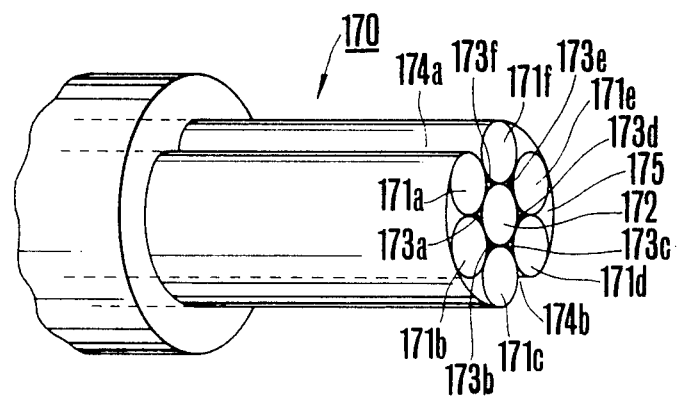

FIG. 25 shows still another embodiment of this invention. A plug 170 comprises six rods 171a through 171f in a hexagonal-packed arrangement, a ball line 172 in tangential contact with each of said rods, six optical fibers which are inserted into 6 interstices formed by said 6 rods and one ball line, a plastic member 175, and two key ways 174a and 174b formed at opposite sides by removing the plastic members between rods 171a and 171f and between rods 171c and 171d. Rods and balls, as mentioned hereinbefore, are processed with an error of less than 1 µm, so that the relative position of six fibers, especially to key ways 174a and 174b, is determined with high accuracy. Further, the rod and ball arrangement is firmly and stably maintained with the plastic member 175.

Figure 26:
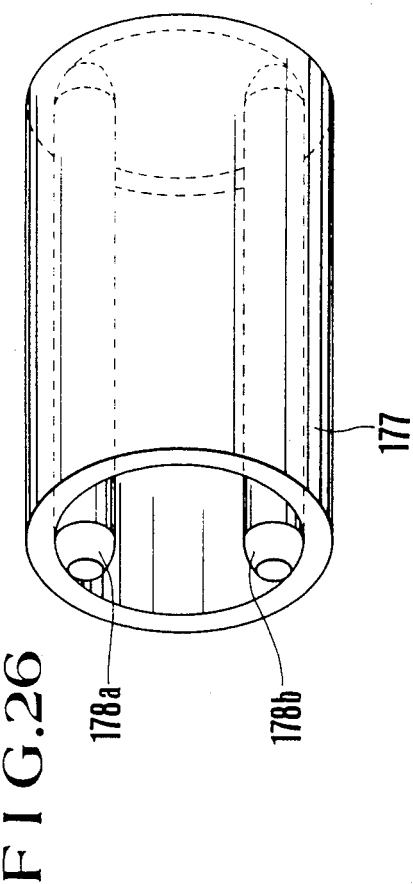
FIG. 26 is a perspective view of a connector sleeve that is coupled with plugs as shown in FIGS. 24 and 25.
Figure 27:
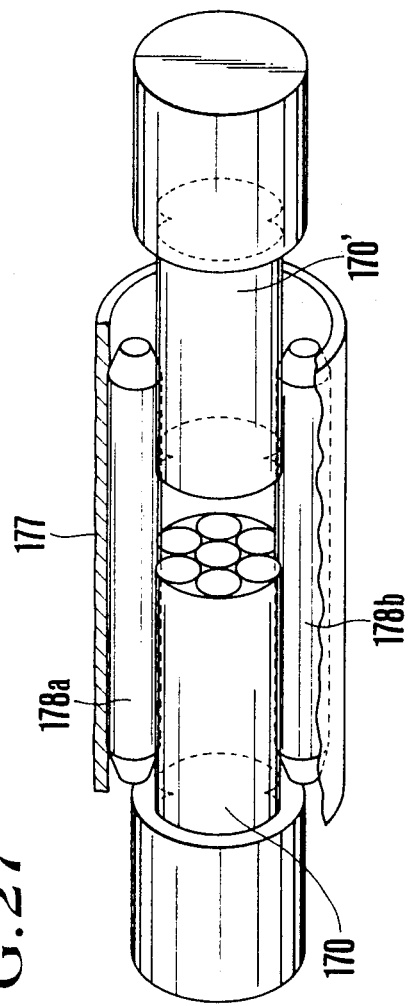
FIG. 27 is a perspective fragmentary sectional view of two plugs with a key way as shown in FIG. 25 being coupled with the connector with the sleeve as shown in FIG. 26.
Figure 28:
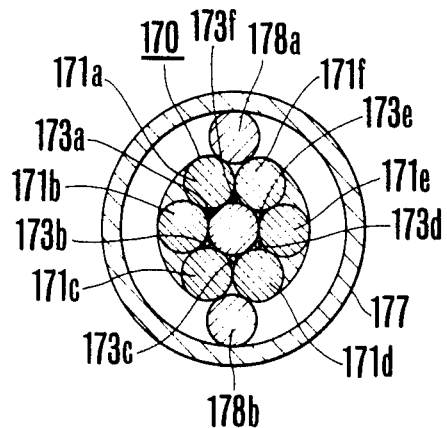
FIG. 28 is a cross sectional representation for showing the coupling state of the plug shown in FIG. 27.

FIG. 26 shows a resilient connector sleeve 177 to receive the plug body as shown in FIG. 25. Said sleeve 177 having a circular or other shaped cross section is provided with two guide pins 178a and 178b which are used for coupling with said key ways 174a and 174b. FIG. 27 shows the coupling state between said plug 170 (170') and said sleeve 177. FIG. 28 shows the cross section of the coupling state as shown in FIG. 27.

According to the coupling as mentioned above, plugs 170, 170' are accurately aligned and at the same time, their axial angular positions are strictly set relative to each other, so that six optical fibers contained in each plug are aligned with accuracy when coupled. In this case, the sleeve for receiving the plug may be formed in a rigid body having precise dimension. However, it may be possible to use such a sleeve that is made of a resilient material with lower accuracy. In other words, it is possible to use a sleeve that elastically deforms itself in response to the insertion of the plug and holds the inserted plug by the spring action caused by its deformation. Such a sleeve is generally manufactured easily at a low cost, and also it allows the plug to enter into itself with less resistance. For this purpose, the sleeve 177 as shown in FIG. 28 may be made of a resilient thin metal. When the plug is inserted into the sleeve 177, the circle of the sleeve cross section is expanded by the force pushing guide pins 178a and 178b in the up and down direction. As a result, the sleeve comes to have a elliptic cross section, of which the vertical axis is a little longer than the horizontal. When the sleeve is deformed, a restoration force is created between said guide pins and that force grasps the inserted plugs firmly.

Figure 29:
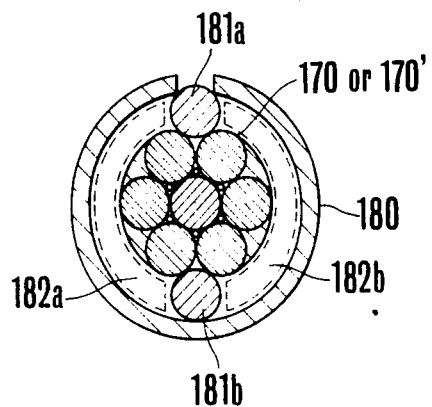
FIG. 29 is a cross sectional representation for showing the coupling state of a plug and connector modified from that shown in FIG. 28.

Another sleeve is shown in FIG. 29 wherein sleeve 180 is a slitted sleeve and is provided with guide pins or rods 181a and 181b at its inside surface. Spring action of the slitted sleeve can bring the same effect as the sleeve as shown in FIG. 28. Further, as shown in FIG. 29, it may be possible to insert spacers 182a and 182b into the space between the plug and the slitted sleeve.

Figure 30:
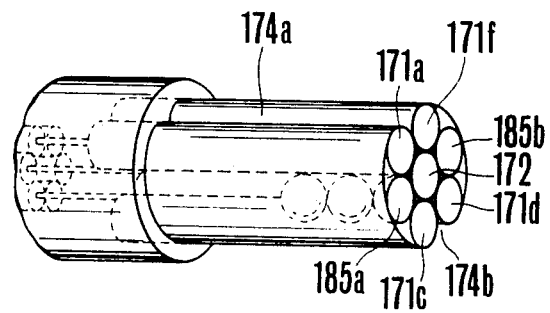
FIG. 30 is another modification of the plug having 2 key ways.

FIG. 30 shows another embodiment modified from the embodiment shown in FIG. 25. Both embodiments are entirely the same except for the rigid members used therein. In other words, the rods 171b and 171e in FIG. 25 are replaced by rigid balls 185a and 185b as shown in FIG. 30.

Figure 31:
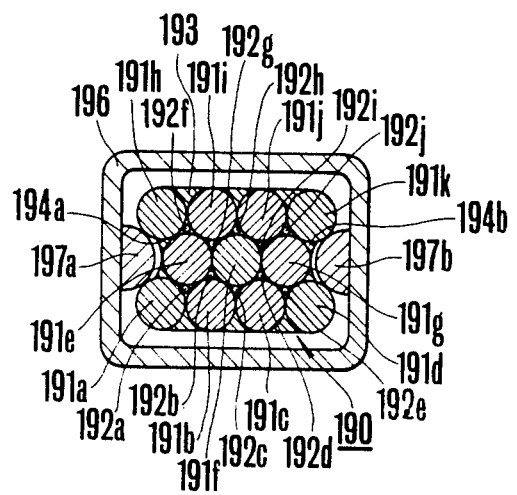
FIG. 31 is a cross sectional representation for showing the coupling state of further modified forms of connector and plug having 2 key ways.

FIG. 31 shows still another embodiment of this invention, in which ten optical fibers are located. A plug 190 comprises cylindrical rigid rods and balls (191a through 191k) which have an identical diameter and are stacked in three layers in 4-3-4 formation so as to form a rectangular cross section; ten optical fibers 192a through 192j of which each is inserted into the interstice formed by every triangle triple set of rigid members; a plastic member 193 molded to contain in lump said optical fibers, rigid rods and balls. Said rods and balls in said every triangle triple set are in tangential contact with one another as well as with the optical fiber running through the tricuspid interstice formed at the center of the set. The outer surface of said plug 190 allows the rigid rods and/or balls 191a through 191d, 191e, 191g and 191h through 191k to be exposed tangentially on it. The key ways 194a and 194b are respectively formed at a space facing rigid members 191a, 191e and 191h and also at another space facing rigid members 191d, 191g and 191k. These key ways mate with guide pins 197a and 197b which are provided on the inside face of a rectangular sleeve 196 in the connector. With coupling by means of these key ways and pins, right connection is achieved between the plug and the sleeve, thus resulting in accurate multifiber plug alignment.

Figure 32:
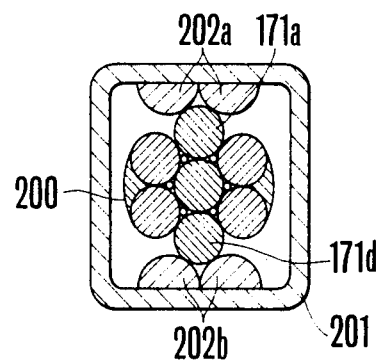
FIG. 32 is a cross sectional representation for showing the coupling state between a plug having two projected keys and a connector.

FIG. 32 shows still another embodiment of the present invention. In this embodiment, instead of key ways, there are provided projecting keys, which are formed by making use of two rigid rods arranged for plug formation. Namely, the plug 200 is obtained by removing the plastic resins between the rods 171a and 171b and also between the rods 171d and 171e (in FIG. 25). With the removal of the plastic resin, the rods 171a and 171d are projected as guide projections. The sleeve for receiving such a plug as constructed above is provided on its inside surface with opposing two pairs of means for accepting said projections. The sleeve 201 itself in this structure, of course, has to be so resilient as to deform itself in response to plug insertion and to contract in its reaction to the plug inserted.

In connectors with plugs and sleeves as shown in FIGS. 24 through 32, the plug angular position to the counter plug is determined in one way, so that optical fiber alignment is easily and accurately achieved not only in single fiber plugs but also in multifiber plugs. Further, mating and detaching plugs are extremely easy, and repetition of them causes no degeneration of fiber connection quality. These have been confirmed by experiments on connectors manufactured for this purpose.

Figure 33:
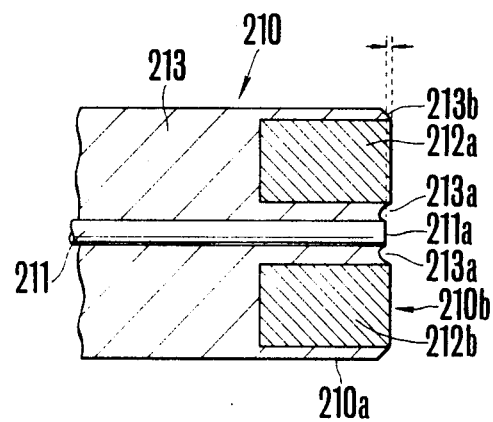
FIG. 33 is a longitudinal cross sectional view of a modified form of optical fiber end structure which is applicable to each embodiment as mentioned above.

FIG. 33 shows the end structure of the plug which is applicable to all the embodiments having been described hereinbefore. A plug 210 comprises an optical fiber 211, three comparatively short rods 212a, 212b and 212c (only 212a, 212b shown) which are arranged around said fiber to be in tangential contact with it, and a plastic member 213 molded to contain said fiber and rods in an integrated structure and to define the outer surface 210a of the plug. Said three rods are in tangential contact with said surface 210a, and are tangentially exposed on it. The end of the plug is finished by using a known polishing process. As a result of this polishing process, the end 211a of the fiber 211 is more deeply polished than the end of rods 212a, 212b and 212c by a few microns. The end surface (213a, 213b) of the plastic member is further polished than said fiber end. Consequently, the end of the plug is led by the hardest member, the rigid rods 212a, 212b and 212c, so that the fragile fiber faces come to oppose each other at a distance of several microns when two plugs are mated with each other, thus preventing fiber faces from being broken. In this case, the distance of several microns between the ends of the fibers means nothing in comparison to the improved fiber connection quality obtained.

In the embodiment as shown in FIG. 33, rigid rods are used as rigid members, but it is apparent that they can be replaced by rigid balls or combination of rods and balls. In this case, it is of course necessary to polish the plug end to the extent that about a half sphere remains.

As will be apparent from the description above, in order to obtain the end structure as shown in FIG. 33, the material of the rigid member is harder than at least the material for the optical fiber. Thus, the rigid member is to be prepared in this case by using such material, for instance, an industrial ruby, sapphire, or the like.

In the foregoing discussion, explanation has been made with respect to rods and balls which have an identical diameter. However, it should be noted that it is not essential to the practice of the invention that the rigid members have an identical diameter. For example, rigid members having different diameters could be used with the same effect if plugs to be mated have a symmetric arrangement of rigid members in the opposing cross sections.

What is claimed is:

1. An optical fiber connector and alignment mechanism comprising at least an optical fiber; at least three rigid members each having a circular cross section with wear resistant surfaces and arranged to surround said optical fiber and with each being in tangential contact with said optical fiber and with two other rigid members; a connector body having internal wear resistant surfaces and a molded plastic member containing said fiber and rigid members in an integral molded plug-like shape having an exterior configuration complementary to the interior configuration of the connector body for interconnecting two such mechanisms with their optical fibers in axial alignment; the outer surface of said molded plastic member being open at a number of points completely around the periphery thereof to allow the surface of said rigid members to be exposed tangentially at least at three arcuately displaced portions completely around the periphery of the molded plastic member for engaging the complementary interior surface of the connector body whereby the contacting complementary surfaces of said rigid members and said connector body are wear-resistant and maintain proper alignment of the optical fibers even after many connect-disconnect operations.

2. The mechanism according to claim 1, wherein said rigid members comprise rigid balls.

3. The mechanism according to claim 1, wherein said rigid members comprise rigid rods.

4. The mechanism according to claim 1, wherein said rigid members are combinations of rigid balls and rods.

5. The mechanism according to any of claims 1 through 4, wherein said rigid members are made of a material that is selected from steel, glass, industrial ruby and sapphire.

6. The mechanism according to any of claims 1 through 4, wherein said plastic member is made of epoxy resin.

7. The mechanism according to claim 1, wherein a part of said rigid members is exposed at the end face including the fiber end.

8. The mechanism according to claim 7, wherein the exposed part of said rigid members at the end face is polished.

9. The mechanism according to claim 1, wherein said plastic member is provided at its end portion with a key way in the form of a groove which restricts revolution about the mechanism axis.

10. The mechanism according to claim 9, wherein the shape of said key way is defined by exposed rigid members.

11. The mechanism according to claim 1 wherein said plastic member is provided at its end portion with a projection, the shape of the projection being defined by exposed rigid members.

12. The mechanism according to claim 1 wherein said plastic member has a circular cross section.

13. The mechanism according to claim 1 wherein said plastic member has a triangular cross section.

14. The mechanism according to claim 1 wherein said plastic member has a rectangular cross section.

15. The mechanism according to claim 1, wherein said optical fiber is a group of optical fibers, of which the external surface is in tangential contact with said rigid members.

16. An optical fiber alignment mechanism according to claim 1 wherein the end face of said mechanism allows said rigid members to be exposed therefrom, and the optical fiber end is located a little inside said rigid member exposed surfaces at the end face so as to be protected thereby.

17. An optical fiber alignment mechanism comprising at least one optical fiber; a plurality of rigid balls surrounding said optical fiber and in tangential contact with it; and a molded plastic member formed in a unitary plug-like shape and containing in an integral structure said at least one optical fiber and said rigid balls, said balls being in tangential contact with one another and having an outer exposed wear resistant surface coextensive with the openings in the exterior surface of said plastic member whereby a part of each ball is exposed tangentially at said surface openings, said balls being divided into a plurality of triangular triple-ball sets, which are stacked in parallel in planes perpendicular to the axis of said optical fiber in such a manner that each triple-ball set takes a position rotated by 60° relative to two other sets on both sides thereof, and said optical fiber extends through the tricuspid interstices formed at the inside of said stacked triple-ball sets.

18. An optical fiber alignment mechanism comprising at least one optical fiber; two triangular triple ball sets; a ring spacer; and a molded plastic member formed in a plug-like shape and containing in an integral structure said optical fiber, the triple-ball sets and spacer, a connector body, said molded plastic member having an exterior configuration complementary to the interior configuration of the connector body for interconnecting two such mechanisms, the balls in each of said triple-ball sets being in tangential contact with one another as well as with the outer surface of said plastic member, a wear resistant part of each ball being exposed tangentially at the outer surface of said plastic member, said optical fiber running through the interstices formed at the inside of said triple-ball sets, and through said ring spacer which is axially arranged intermediate said two triple-ball sets.

19. An optical fiber alignment mechanism comprising a plurality of optical fibers, a plurality of rigid members surrounding each of said fibers, and a molded plastic member formed in a plug-like shape and containing in a molded integral structure said optical fibers and rigid members, a connector body, said molded plastic member having an exterior configuration complementary to the interior configuration of the connector body for interconnecting two such mechanisms, said rigid members being arranged in a plurality of layers and being in tangential contact with neighbour members, each of said optical fibers running through respective interstices formed by sets of adjoining three rigid members and being in tangential contact therewith, and wear resistant surfaces of each rigid member comprising the outer peripheral side, rigid members being tangentially exposed at different peripheral points around the outer surface of said plastic member.

20. The mechanism according to claim 19 wherein said rigid members are selected from rigid balls and rigid rods.

21. The mechanism according to claim 19 wherein said plastic member has a rectangular cross section.

22. The mechanism according to claim 21, wherein the number of layers of rigid members is two and wear resistant surfaces of all of the rigid members are tangentially exposed at different peripheral points around the outer surface of the plastic member.

23. The mechanism according to claim 21, wherein the number of layers of rigid members is three and only the wear resistant surfaces of the outer layers of said rigid members are tangentially exposed at different points around the periphery of the outer surface of the plastic member.

24. An optical fiber alignment mechanism comprising a plurality of optical fibers; a plurality of rigid members surrounding each of said optical fibers; and a molded plastic member formed in a plug-like shape to contain in a molded integral structure said optical fibers and rigid members, a connector body, said molded plastic member having an exterior configuration complementary to the interior configuration of the connector body for interconnecting two such mechanisms, said rigid members being arranged such that one of the members is positioned at the center and the remaining rigid members are annularly positioned around said center member, said center rigid member being in tangential contact with all of said surrounding rigid members, each of which is also in tangential contact with the rigid members on both its sides, each of said optical fibers being disposed in interstices defined by said center rigid member and an adjoining two of said annularly arranged rigid members, and each of said annularly arranged rigid members having wear resistant surfaces tangentially exposed at different peripheral points around the outer surface of said plastic member.

25. The mechanism according to claim 24, wherein said rigid members are selected from rigid rods and rigid balls.

26. The mechanism according to claim 24, wherein said mechanism is provided with a key way for limiting axial rotation of the mechanism, said key way being formed by exposed rigid members.

27. An optical fiber alignment mechanism comprising at least one optical fiber; a plurality of rigid members surrounding and being in tangential contact with said optical fiber; and a molded plastic member formed in a plug-like shape and containing in an integral structure said optical fiber and said rigid members, a connector body, said molded plastic member having an exterior configuration complementary to the interior configuration of the connector body for interconnecting two such mechanisms, said rigid members consisting of two rigid rods in tangential contact and adjoining rigid balls which are in tangential contact with both of said rigid rods, and wear resistant surfaces of said rigid rods and balls being tangentially exposed at different peripheral points around the outer surface of said plastic member.

28. The mechanism according to claim 27, wherein said mechanism is provided with a key way for limiting axial rotation of the mechanism, said key way being formed by exposed rigid members.

29. An optical fiber alignment mechanism comprising at least an optical fiber; a plurality of rigid members surrounding and in contact with said optical fiber; and a molded plastic member formed in a plug-like shape and containing in a single integral molded structure said optical fiber and said rigid members, a connector body, said molded plastic member having an exterior configuration complementary to the interior configuration of the connector body for interconnecting two such mechanisms, said rigid members consisting of a rigid rod and two lines of rigid balls, each ball in said ball lines being in tangential contact with said rigid rod as well as with two balls on both its sides, said optical fiber running through the interstice formed in parallel with said rod by means of the spaces between said two ball lines and rod, and wear resistant surfaces of said balls comprising the two lines of balls and the rod being tangentially exposed at different peripheral points around the outer surface of said plastic member.

30. An optical fiber alignment mechanism comprising at least an optical fiber; a plurality of rigid members surrounding and being in tangential contact with said optical fiber; and a molded plastic member formed in a plug-like shape to secure said optical fiber and rigid members together in a single integral structure, a connector body, said molded plastic member having an exterior configuration complementary to the interior configuration of the connector body for interconnecting two such mechanisms, said rigid members consisting of tangentially and parallely adjoining two rigid rods and a line of balls, each ball of which is lined along said two rods and is in tangential contact with said rods as well as with two balls on each side thereof, were resistant surfaces of said rods and line of balls being tangentially exposed at different peripheral points around the outer surface of said plastic member, and the outer plastic portion extending between said two rods being removed to form a key way for limiting the axial rotation of the mechanism.

31. An optical fiber alignment mechanism comprising a plurality of optical fibers; a plurality of rigid members surrounding each of said plurality of optical fibers; and a molded plastic member formed in a plug-like shape around said optical fibers and rigid members to secure said optical fibers and rigid members together in a single integral structure, a connector body, said molded plastic member having an exterior configuration complementary to the interior configuration of the connector body for interconnecting two such mechanisms, said rigid members being arranged such that one of the members is positioned at the center and the remaining members are annularly arranged around said center member, said center member being in tangential contact with all of said annularly surrounding rigid members, each of which is also in tangential contact with rigid members on both its sides, each of said optical fibers being disposed in an interstice defined by said center rigid member and an adjoining two of said annularly arranged members, wear resistant surfaces of said annularly arranged members being tangentially exposed at different peripheral points around the outer surface of said plastic member, and another portion of said molded plastic member extending across two adjoining rods being removed to form a key way which is adapted for use in restricting axial revolution of the mechanism.

32. An optical fiber connector comprising:
two optical fiber plug means each including a plug main body which comprises at least an optical fiber, at least three rigid members with a circle cross section which are arranged to surround said optical fiber and of which each is in tangential contact with said optical fiber as well as with two other rigid members, and a molded plastic member formed by molding said member in a plug-like shape around said fiber and rigid members in a single integral structure, a connector body having wear resistant internal surfaces, said molded plastic member having an exterior configuration complementary to the interior configuration of the connector body for interconnecting two such plug means, the outer surface of said plastic member being removed to expose wear resistant surfaces of said rigid members exposed tangentially at least at three different peripheral points around the periphery thereof; and
said connector body comprising a receptacle formed by a resilient sleeve having wear resistant internal surfaces for receiving said two optical fiber plug means from both its sides for interconnecting the same, a housing for containing said sleeve, and means for determining the position of said sleeve in said housing.

33. The connector according to claim 32, wherein said sleeve is provided with a slit formed in the axial direction of the connector.

34. The connector according to claim 32, wherein each of said optical fiber plug means further comprises a base, a guide cylinder portion extending in one direction from said base, and said plug main body which extends from said base opposite to said guide cylinder portion, a spring acting against the base for biasing said optical fiber plug means in the direction towards each other within the connector, and an outer housing containing said first mentioned housing and said two optical fiber plug means.

35. The connector according to claim 34, wherein said plug main body is provided with a key way for limiting its axial revolution while said sleeve is provided on its inner wall with a guide pin to mate with said key way.

36. The connector according to claim 35, wherein there is provided a spacer intervening between said plug main body and said sleeve except between said guide pin portion and the inner wall of said sleeve.

37. The connector according to claim 35, wherein a key is constituted with a projection and said guide pin is formed to receive said projection.

* * * * *